United States Patent [19]
Schouten

[11] Patent Number: 5,230,602
[45] Date of Patent: Jul. 27, 1993

[54] SOD ROLL STACKER

[76] Inventor: Ben H. Schouten, 393 Greens Road, R. R. #2, Caledonia, Ontario, Canada, N0A 1A0

[21] Appl. No.: 922,484

[22] Filed: Jul. 31, 1992

[51] Int. Cl.$^5$ .................. B65G 57/00; B65G 67/24
[52] U.S. Cl. ................ 414/789.7; 414/792.3; 414/792.6; 414/907
[58] Field of Search ............ 414/789.7, 792.3, 792.6, 414/794.3, 793.4, 794.7, 907

[56] References Cited

U.S. PATENT DOCUMENTS

| | | | |
|---|---|---|---|
| 3,225,942 | 12/1965 | Fossenier | 414/792.3 |
| 3,367,518 | 2/1968 | Bishop | 414/789.7 |
| 3,554,388 | 1/1971 | Thompson | 414/792.3 |
| 3,675,793 | 7/1972 | Wetzel | 214/6 B |
| 3,877,584 | 4/1975 | Holcombe | 214/6 B |
| 3,887,013 | 6/1975 | Helberg | 172/20 |
| 4,162,726 | 7/1979 | Hudson et al. | 198/678 |
| 4,294,316 | 10/1981 | Hedley et al. | 172/20 |
| 4,408,666 | 10/1983 | Lawson | 172/19 |
| 4,828,040 | 5/1989 | Schumacher | 172/19 |
| 4,966,239 | 10/1990 | Hutchison | 414/789.7 |

Primary Examiner—H. Grant Skaggs
Attorney, Agent, or Firm—Ridout & Maybee

[57] ABSTRACT

A sod roll stacker assembles sod rolls into rows and places the rows on a platform member to form an approximately square layer of sod roller. When the layer is complete, the platform is removed allowing the layer to fall on a support member below the platform. The platform is then moved to its former position. The above cycle of operations is repeated. The support member is rotated about a vertical axis through about 90° after each cycle so that a stack of rolls is built up having the axis of the rolls in each layer at about 90° to the adjacent layer, thereby increasing the stability of the stack.

23 Claims, 11 Drawing Sheets

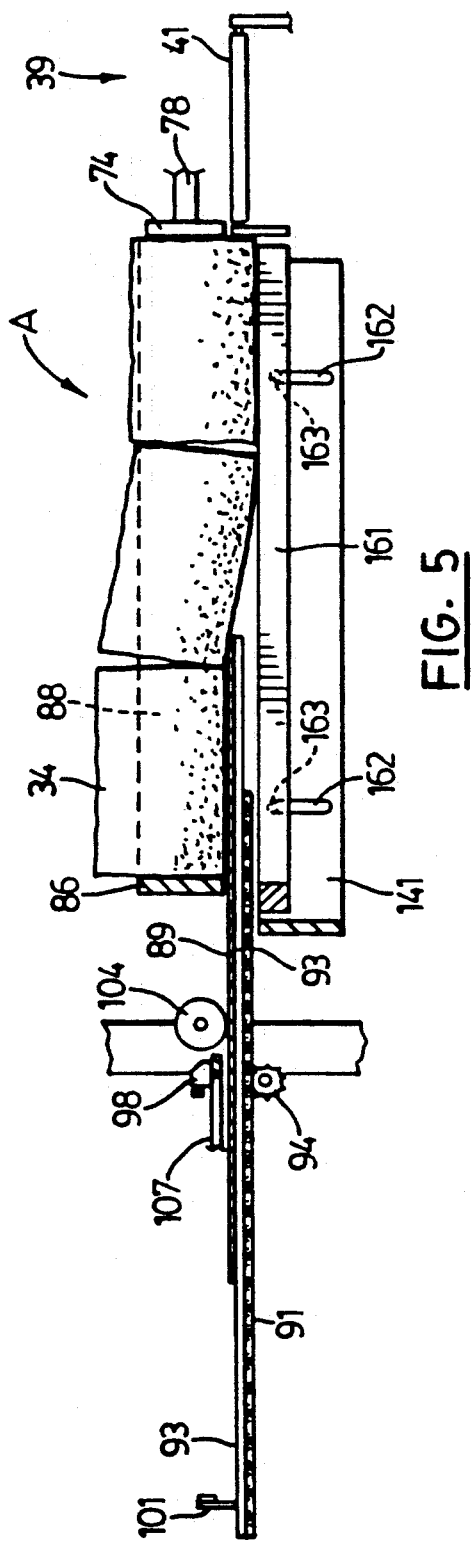
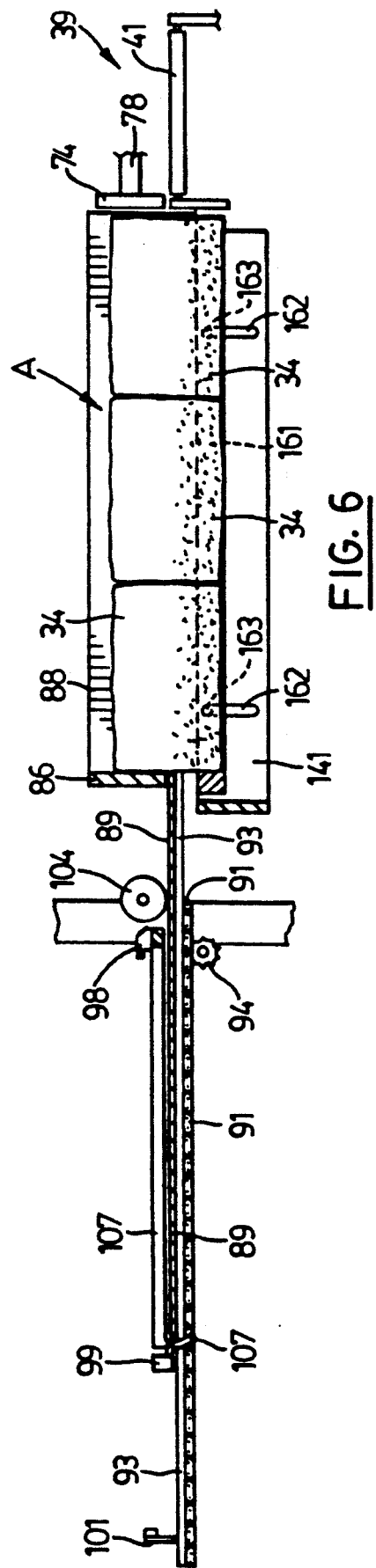

SOD ROLL STACKER

The present invention relates to sod roll stacker apparatus.

In the conventional procedure for harvesting sod, a sod cutting and coiling or rolling apparatus is used together with a trailer on which the sod rolls are stacked. The trailer is towed behind the cutting and rolling apparatus or is drawn along parallel to it by another vehicle such as a tractor. The cutting and rolling apparatus lifts the sod, cuts it into strips, and severs the strips into even lengths. The apparatus then rolls the strips into substantially cylindrical rolls, which are delivered successively along a conveyor belt or like conveyor means toward the trailer. Operatives standing on platforms adjacent the belt or the trailer lift the rolls from the belt and stack them manually on the trailer. Considerable manual effort is required to lift and stack the sod rolls, and it has become increasingly more difficult in recent times to find laborers willing to engage in the unskilled, exhausting and arduous task of sod roll stacking. Further, the use of manual labor greatly increases the costs, and limits the efficiency of the sod harvesting process.

Proposals have been made in Lawson U.S. Pat. No. 4,408,666 dated Oct. 11, 1983 and Schumacher U.S. Pat. No. 4,828,040 of devices for assisting in sod roll stacking, but the prior devices known to the applicant have not been as efficient or cost effective as is desirable.

The present invention provides a mobile stacker for stacking sod rolls, comprising a frame supported on ground reaction members for movement over the ground and having thereon: means for assembling successive pluralities of said sod rolls in an elongated row wherein each roll has its axis transversely of the direction of elongation; a platform member adjacent the assembling means; means for pushing each said elongated row transversely from said assembling means onto an upper surface of said platform member thereby building up a layer comprising a plurality of said rows disposed laterally adjacent one another on said upper surface; a support member positioned below the platform member; means for removing said platform member allowing said layer on said platform member to move downwardly to be supported on said support member; means for rotating said support member intermittently about a vertical axis through an arc of 90°; and means for lowering and raising the support member whereby a stack of sod rolls comprising a plurality of adjacent layers, of which the rolls in each layer have their axes disposed at right angles to the adjacent layers, is built up on the support member.

The stacker of the invention may be attached to and towed behind the sod cutting and rolling apparatus or may be drawn by a separate tractor or the like so that it travels along with the sod cutting and rolling apparatus. The stacker of the invention builds up layers of the sod rolls having axes at 90° to adjacent layers in order to provide stability for the stack, and the stacker allows the stacks to be formed completely, or substantially completely, without the intervention of unskilled manual labor.

One preferred form of a stacker of the invention is described hereinafter in more detail, by way of example only with reference to the accompanying drawings, in which:

FIG. 5 is a partial section taken along the line 5—5 in FIG. 4 showing a sliding support member partially withdrawn;

FIG. 6 is a view corresponding to FIG. 5 showing the sliding support member fully withdrawn;

Figure 1:
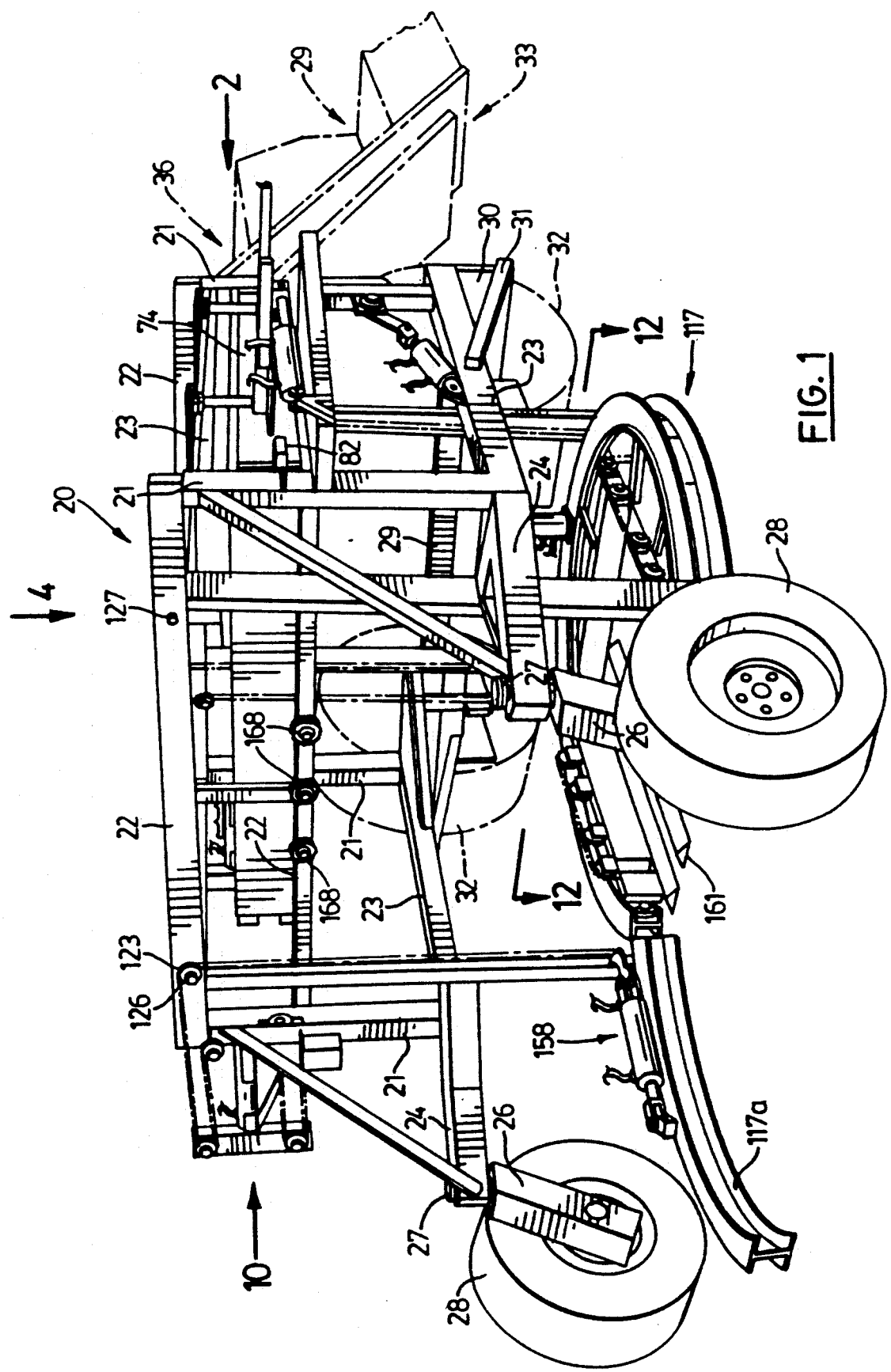
FIG. 1 is a rear perspective view of one form of a sod stacker apparatus in accordance with the invention.

Referring to the drawings, the stacker apparatus comprises a generally rectangular frame 20 formed from four vertically extending members 21, upper and lower transversely extending members 22 at the front and at the rear, and upper and lower longitudinally extending members 23 at each side. These members are connected together to form a rigid frame structure.

At the rear, the frame 20 connects to rearwardly and transversely outwardly extending struts 24. These react with trailing legs 26 through swivel bearings 27. The legs 26 are provided with ground wheels 28 supporting the rear of the frame.

The stacker as shown is designed to be attached to a conventional sod cutting and rolling apparatus shown in broken outline at 29. At the front, a beam 30 spans between the front ends of the lower longitudinal frame members 23. The beam 30 is braced at each side with a strut 31 connecting rearwardly and upwardly with the adjacent member 23. A conventional hitch device (not shown) may connect between the beam 30 and the rear of the apparatus 29 so that the front of the stacker is supported on the apparatus 29, the rear wheels of which are shown in broken outline in FIG. 1 at 32.

In the example illustrated, the apparatus 29 is provided with a conventional sod pad cutting and rolling device 33, which lifts and cuts sod pads or strips of standard length and width and coils the strips lengthwise about an axis extending transverse of the strip to form substantially cylindrical sod rolls 34. Merely by way of example, the rolls 34 in one instance are approximately 9 ½ inches in diameter and the cutting device may be set to cut strips of a standard width, for instance 16 inches, so that the axial length of each cylindrical roll is then 16 inches.

In the example illustrated, the rolls 34 are conveyed upwardly and rearwardly by a conveyor 36 forming part of the conventional device 33 and comprising upper and lower driven endless belts 37 and 38.

An assembling tunnel 39 is provided on one side of the frame 20 adjacent and in alignment with the upper end of the conveyor 36. This tunnel receives successive rolls 34 and assembles them into a row of, for example, five, rolls 34 with their axes traverse of the row. The tunnel 39 comprises lower and upper flights of parallel rollers 41 and 42 respectively. Preferably, the rollers 41 and 42 are so-called "live rollers". That is, they are supported on friction-reducing bearings so that they spin freely about their axes in a substantially frictionless manner. The lower rollers 41 are supported at each end in longitudinally extending beams 43 secured to the frame 20. The upper rollers 42 are similarly supported in longitudinally extending beams one of which, 44, is visible in FIGS. 2 and 3. The beams 44 are slidable vertically relative to the frame 20 so that the spacing between the upper and lower flights 41 and 42 may be adjusted. In the example shown, threaded studs 46 connect to the beams 44 and pass through openings in an upper frame member 23. Nuts 47 threaded on the studs 46 engage opposite faces of the frame member 23 to allow for vertical adjustment. Preferably, the vertical spacing between the upper and lower flights of rollers 41 and 42 is somewhat less than the diameter of the rolls 34. For example the spacing may be about 8 ½ inches in the case in which the diameter of the rolls is about 9 ½ inches. As a result the rolls 34 received in the tunnel 39 are somewhat compressed and flattened as seen in FIG. 3 as an aid to stable stacking.

A lift paddle 48 received the rolls 34 from the conveyor 36 and inserts them into the tunnel 39. The paddle 48 comprises a crank arm 49 pivoted on a horizontally transverse bearing at 51 on a vertical frame member 21 adjacent the rear of the conveyor 36. An outer or front end of the paddle 48 is provided with a basket like roll receiving and supporting structure comprising a transverse row of upwardly directed fingers 52 curving convexly with respect to the pivot axis 51 so that they conform to the cylindrical flanks of the rolls 34, and end fingers 53 spaced apart the length of the rolls engaging the opposite end faces of the rolls 34.

The crank arm 49 is rotated by a hydraulic piston 54 pivoted to the arm 69 at 56 and working in a hydraulic cylinder 57 articulated to a frame member 23 at 58. Upper and lower limit switches 59 and 61 control the movement of the paddle 48. In an upper position shown in FIG. 3 the upper switch 59 is activated and this serves to operate valving connected to the hydraulic cylinder so that the piston retracts to the position shown in FIG. 2. In the lower position shown in FIG. 2, the lower switch 61 is activated serving to operate the valving so that the piston 54 is extended to the position shown in FIG. 3. The switch 61 is subjugated to the control of a switch 62 connected on the conveyor 36 and equipped with a transversely extending wand 63. Each roll 34 ascending the conveyor 36 strikes the wand 63, actuating the switch 62 and permitting the switch 61 to be energised so that the paddle 48 rocks upward to the position of FIG. 3 and then downward to the position of FIG. 2 and normally stays in the position of FIG. 2 until switch 62 is again energized, or a paddle override switch, discussed later, is energised.

Figure 2:
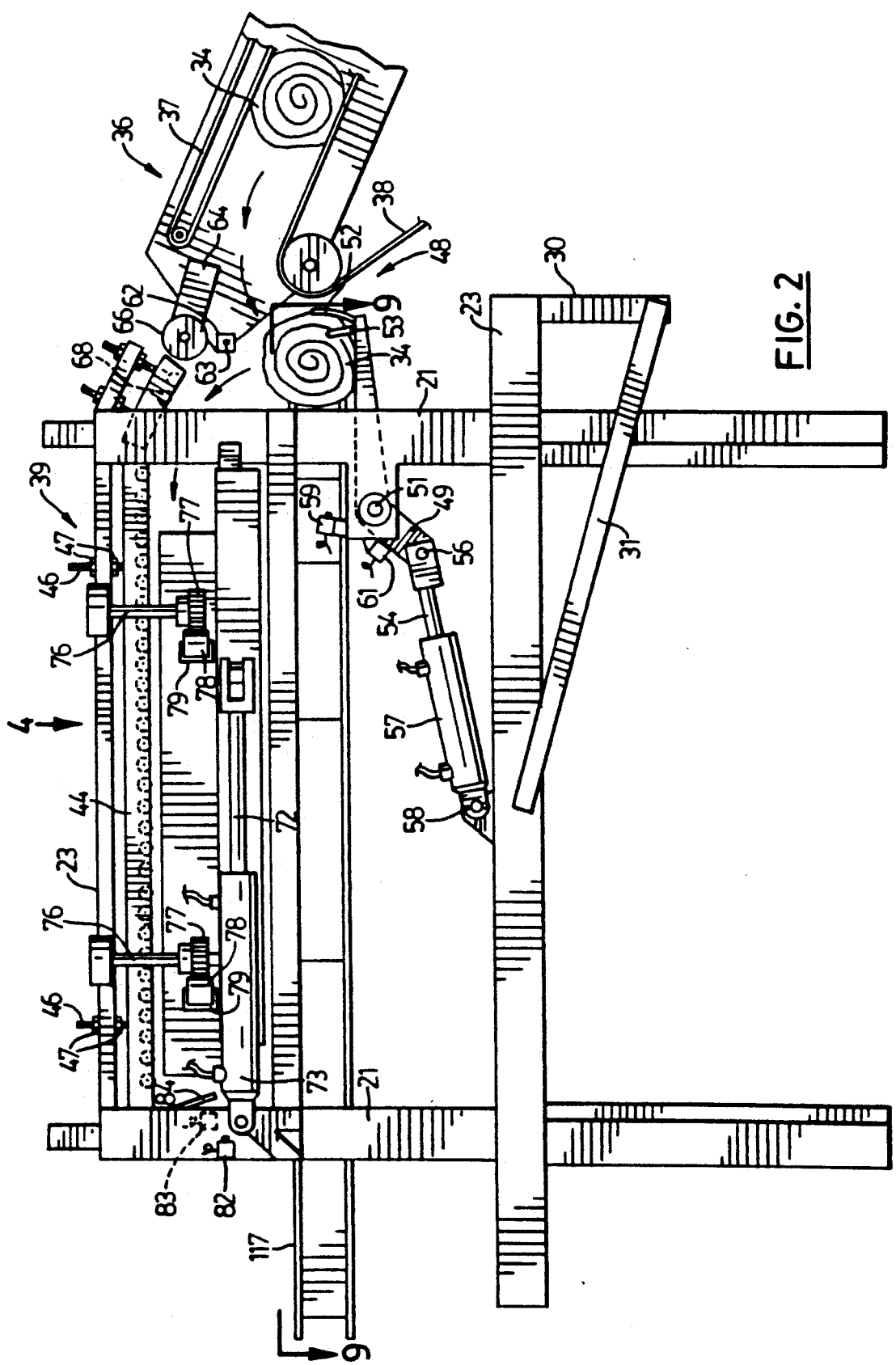
FIG. 2 is a somewhat simplified side view looking in the direction of the arrow 2 in FIG. 1.
Figure 3:
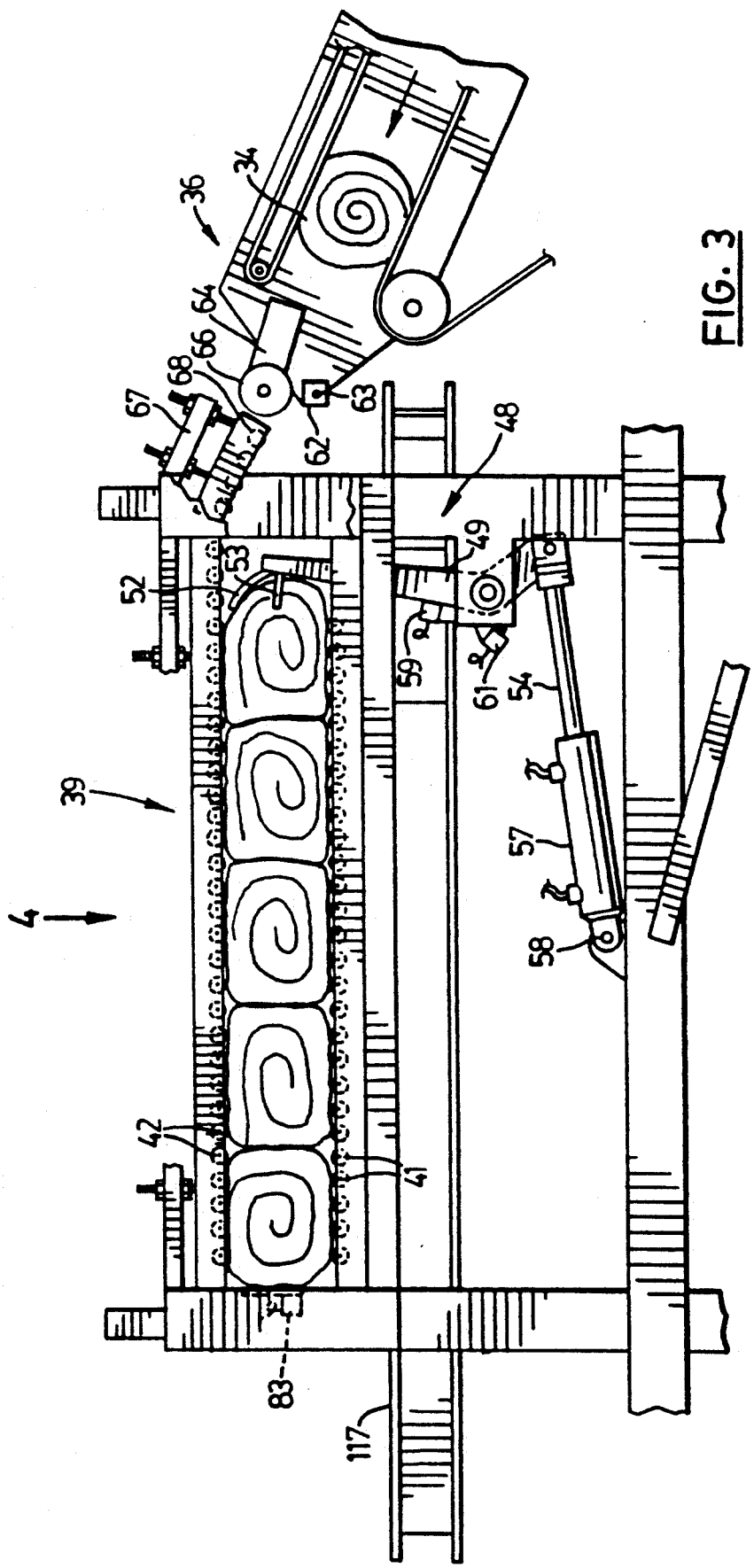
FIG. 3 is a view similar to FIG. 2 showing the sod roll propulsion member in raised position inserting a sod roll in the assembling guide means.

A rearward extension 64 of the conveyor 36 supports a freely rotating roller 66 which contacts the upper side of each roller 34 near the upper end of the conveyor 36 and deflects the roll 34 downwardly into the basket-like roll receiving end of the paddle 48 when in the lower position shown in FIG. 2.

A forward extension 67 for the frame member 21 adjustably supports a short flight of "live" rollers 68 inclining upwardly forwardly toward the upper roller flight 44. Preferably the rollers 68 are disposed on an arc with its centre of curvature at the paddle crank arm pivot 51. As the paddle 48 raises from the position of FIG. 2 toward the position of FIG. 3, the upper side of the roll 34 received in the paddle 48 engages the rollers 68 which are angled to slightly compress the upper side of the roll 34 and assist in injecting it smoothly into the tunnel 39.

The compressive force exerted on the rolls 34 between the upper and lower roller flights 44 and 42 tends to retard movement of the rolls 34 longitudinally through the tunnel 39 so that each inserted roll 34 is pushed rearwardly by the next succeeding inserted roll 34.

Figure 4:
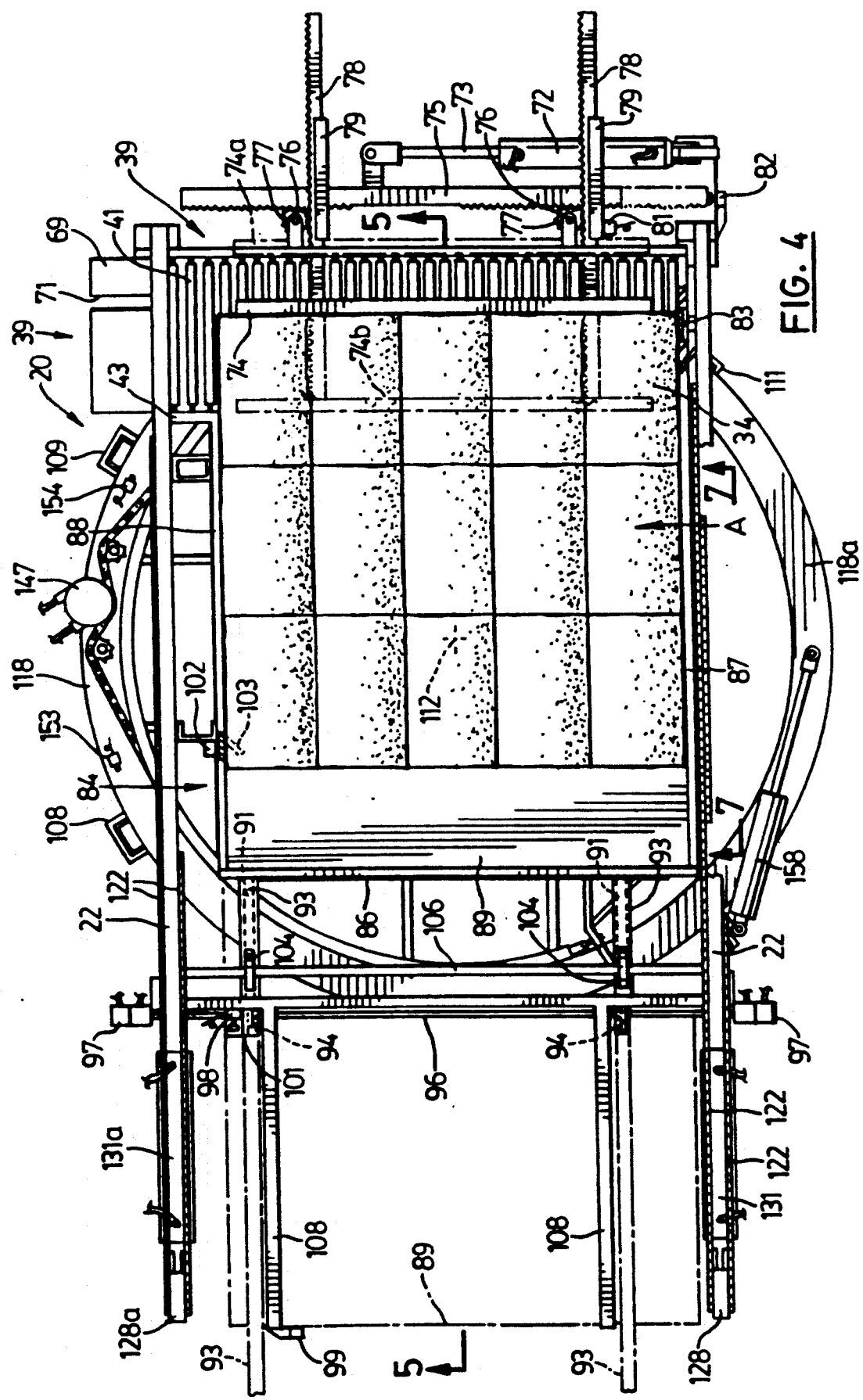
FIG. 4 is a simplified plan view of the apparatus of FIG. 1 and viewed along arrow 4 in FIG. 1.

A support plate 69 mounted on the frame 20 in alignment with the lower flight of rollers 41 forms a rearward extension of the lower side of the tunnel 39 and as seen in FIG. 4 has a slot 71 in it which is received the crank arm 49 of the paddle 48 in the upper position.

The frame supports a hydraulic piston 72 and cylinder 73 transversely outward of the tunnel 39. The piston 72 is coupled through a rack and pinion drive to a pusher plate 74 which in the fully extended position of the piston 72 is positioned parallel to and is laterally outwardly to one side of the assembling tunnel 39 as seen in broken lines in FIG. 4 at 74a. The drive comprises a double-toothed rack 75 engaging lower pinions (not seen in the drawings) keyed to respective shafts 76 on which are keyed upper pinions 77 driving laterally extending racks 78 supported in slides 79 mounted on the frame 20. The inner end of each rack 78 is connected on the plate 74. When the piston 72 is retracted relative to the cylinder 73, the drive pushes the plate 74 laterally inwardly to the position 74b shown in FIG. 4, pushing an assembled row of rolls 34 laterally from the tunnel 39.

The movement of the plate 74 is controlled by a limit switch 81 which is activated by plate 74 in position 74a and operates valving connected to the cylinder 73 tending to retract the piston and extend the plate 74 toward position 74b, and a second limit switch 82 activated by rack 75 in position 74b of the plate 74 and controlling the valving connected to the cylinder 72 to extend the piston 73 and retract the plate 74. The switch 81 is subjugated to the control of a limit switch 83 activated by a spring loaded plate 84 when a complete row of rolls 34 is built up in the tunnel 39 as shown in FIG. 3. This causes the plate 74 to extend from the position 74a to the position 74b and return to position 74a and remain in position 74a until switch 83 is again actuated after the next complete row of rolls is built up in tunnel 39.

The upper central position of the frame 20 adjacent the tunnel 39 is occupied by a tray-like sod roll layer receiving structure 84, comprising a rear wall 86 spaced from and facing toward the tunnel 39 and spaced parallel side walls 87 and 88. The walls 86 to 88 are fixed to the frame 20 and define with the adjacent edge of the tunnel 39 on approximately square area which is slightly larger than the approximately square layer of sod rolls 34 it is desired to build up. For example in the case in which the stacker is to handle approximately 9 ½ inch ×16 inch rolls 34 the walls 86 to 88 preferably define an area approximately 49 inches ×49 inches (slightly larger than a layer 47 ½×48 inches which may be built up from three rows of 16 inch wide rolls 34, each row comprising five rolls 9 ½ inches in diameter).

The bottom of the structure 84 comprises a laterally slidable floor 89 normally extending fully inserted under the walls 86 to 88. The floor 89 is retracted from the normal position of FIG. 4, through an intermediate position as shown in FIG. 5, to a fully retracted position, shown in FIG. 6, (and by broken lines in FIG. 4), by a chain and sprocket drive comprising a pair of longitudinally spaced chains 91. Each chain 91 is connected to the underside of a respective transversely extending extension arm 93, the arms 93 being connected to the underside of the floor 89 and spaced apart. The chains 91 are driven by respective sprockets 94 keyed on a shaft 96 driven by reversible motors 97. The operation of the motors 97 is controlled in part by a closed floor limit switch 98 and in part by an open floor limit switch 99 adapted to be activated in the fully inserted (FIG. 4) and fully retracted (FIG. 6) positions by a member 101 attached to one extension arm 93 and by an outer edge of floor 89, respectively, as will be seen from consideration of FIG. 4. Somewhat similar to the manner of operation of the limit switch pairs 59 and 61 and 81 and 82, the switch 98 is subjugated to the control of a further switch 102 activated by an outwardly biased flap 103 on the side 88 of the structure 84. When a leading corner of a complete layer A of rolls 34 is pushed onto the floor 89 as seen in FIG. 4, the spring-biassed flap is deflected inward from the position shown in broken lines in FIG. 4 and actuates switch 102. The floor 89 may then retract from the position of FIG. 4 to the fully retracted position shown in FIG. 6. When the floor 89 is closed and the switch 89 is actuated, the motors 97 stop and the switch 89 provides a signal, for example a warning light in the operator's cab, indicating to the operator that the floor is closed. Similarly, when the switch 99 is actuated, the motors 97 stop.

In the fully inserted (FIG. 4) and partially withdrawn positions (FIG. 5) of the floor 89, the edges of the floor 89 are supported slidingly on angle brackets (not seen in the drawings) connected to the opposed horizontal frame members 22 extending adjacent the parallel side walls 87 and 88. Anti-tilt rollers 104, mounted on a shaft 106 journalled for free rotation on the frame 20 at its ends, engage the upper side of the extension arms 93 in the fully inserted (FIG. 4) position and engage the upper side of the floor 89 in its partially and fully retracted position seen in FIGS. 5 and 6 and prevent the inner edge of the floor 89 from disengaging from under the wall 86 and from the above-mentioned supporting brackets. In the fully retracted position of FIG. 6, the floor 89 is stabilized by having its outer edge received by a pair of hook-shaped projections 107 on the underside of respective laterally outwardly extending spars 108 rigidly connected to the frame 20. As seen in FIG. 6, the open floor limit switch 99 is connected on one of these spars 107. The spar 107 is shown broken away in FIG. 5 for greater clarity.

The frame 20 supports four vertically extending channel section frame members 108 to 111 (seen in FIGS. 9 to 12) at points spaced equidistantly from a vertical axis 112 passing through an approximate centre of the square area defined by the layer receiving structure 84. The channel of each of the members 108 to 111 faces inward toward the axis 112 and each receives in sliding vertical engagement a block, 113 to 116 respectively. These blocks are connected to the outer edge of a circular track 117 of I-section, comprising upper and lower flanges 118 and 119 and a central web 121. The track 117 as a whole can slide upwardly and downwardly within the guide structure found by the vertical channel members 108 to 111 The track 117 is supported on a set of four chains 122, one chain 122 being connected adjacent each block 113 to 116. The chains 122 are arranged in pairs. One pair, connected adjacent the blocks 115 and 116 extends upwardly to adjacent the upper rear horizontal frame member 72. As seen in FIG. 10, the chains 122 pass over sprockets 123 and 124 connected for free rotation on shafts 126 and 127, one sprocket 123 being on the rear and the other sprocket 124 being on the front side of the frame member 22. The chains 122 pass on opposite sides of the member 22 laterally outwardly toward a tensioning device comprising a tensioning member 128 activated to a piston 129 of a hydraulic cylinder 131. Each chain passes in a serpentine path around an upper and lower idler sprocket 132 on the member 128 and upper and lower idler sprockets 133 on the adjacent vertical frame member 21 and is anchored at its lower end at 134 on the frame member 21, As will be appreciated the sprockets 132 and 133 are provided in pairs on opposite sides of the members 21 and 128 to accommodate the pair of chains 122. The winding of the chains about the sprockets 132 and 133 provide a velocity ratio such that a small movement of the member 128 results in a large movement of the track 117.

Figure 11:
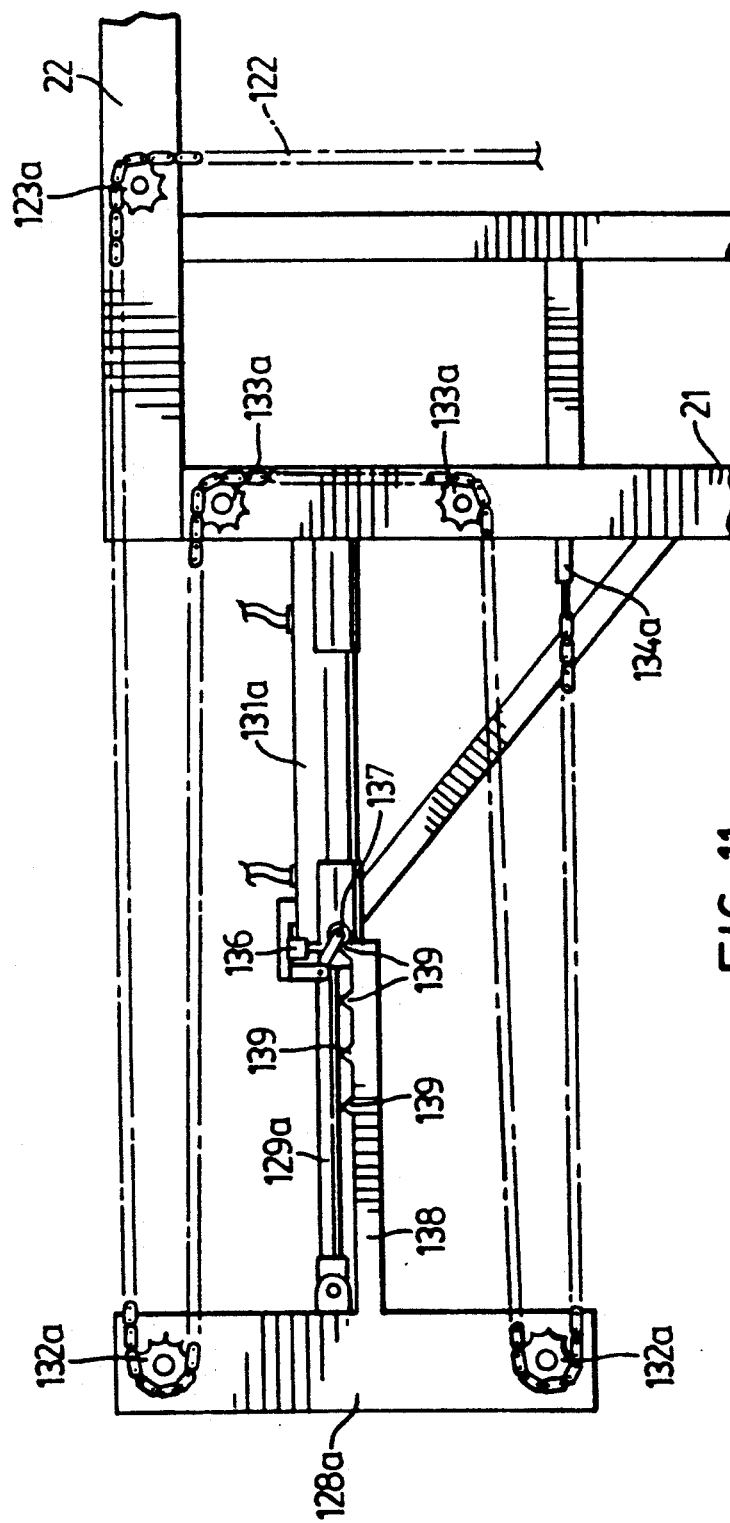
FIG. 11 is a partial side view showing a further portion of the raising and lowering arrangement and taken on the arrow 11 in FIG. 1.

The pair of chains 122 connected adjacent the blocks 113 and 114 on the opposite side of the track 117 pass in similar fashion upwardly about sprockets connected on an upper front frame member 22 adjacent the foot of the frame 20, one of these sprockets 123a being seen in FIG. 11. The chains pass in serpentine fashion about sprocket 132a connected on a further tensioning member 128a, sprockets 133a on the adjacent vertical frame member 21 and being anchored at 134a on a member 21. In this case, the cylinder 131a is equipped with a limit switch 136 activated by a cam follower 137. The cam follower 137 is in turn acted on by a cam 138 connected to the tensioning device 128a and having four lobes 139 thereon. The limit switch 136 serves to control dump valves controlling dumping of hydraulic fluid from the pistons 131 and 131a. With the pistons 129 and 129a extended, the chains 122 are tensioned laterally outwardly and are drawn upwardly such that the track member 117 is in a fully raised position as seen in FIGS. 2 and 3. In this position, the switch 136 is not actuated by the cam follower 137. When the floor 89 is fully open, and its outer edge contracts the open floor limit switch 99, the switch 99 actuates the dump valves which open to allow dumping of hydraulic fluid from the cylinders 131 and 131a. As the pistons 129 and 129a retract, the chains 122 commence lowering the track 118 and the first lobe 139 on the cam 138 actuates switch 136. The operation of the switch 136 continues to hold the dump valves open, so that the pistons 129 and 129a retract to a position in which the cam follower 137 falls into the recess between the first two lobes 139 and de-activates the switch 136. This results in the dump valves closing, maintaining the track 117 in a partially lowered position until the open floor limit switch 99 is actuated again, at which point the above cycle of operation may be repeated. De-activation of the switch 136 at this point also causes the motors 97 to be operated in the sense closing the floor 89 until the switch 98 is actuated and the motors 97 are stopped. The interval between each lobe 139 corresponds to one thickness of sod rolls, so that in the example illustrated, five layers of sod rolls may be built up until the pistons 129a and 129 are partially retracted and the cam follower 137 is disposed on the upper side of the cam bar 138 between the tensioning member 128a and the end one of the lobes 139 closest to the tensioning member 128a.

Feed of hydraulic fluid into the cylinders 131 and 131a and dumping of fluid from the cylinders 131 and 131a is also controllable by track raising and lowering override switches (not seen in the drawings) which may be located in an operator's cab or the like. These allow fluid to be dumped from the cylinders 131 and 131a after a stack of, for example, five layers of rolls has been built up, so that the track 117 is fully lowered and the pistons 131 and 131a fully retract to the position shown in FIG. 10. In the fully lowered position, as seen also in FIG. 1 the lower side of the track 117 is just slightly above the ground surface. The override switches also allow the track 117 to be fully raised by extending the pistons 131 and 131a.

Figure 9:
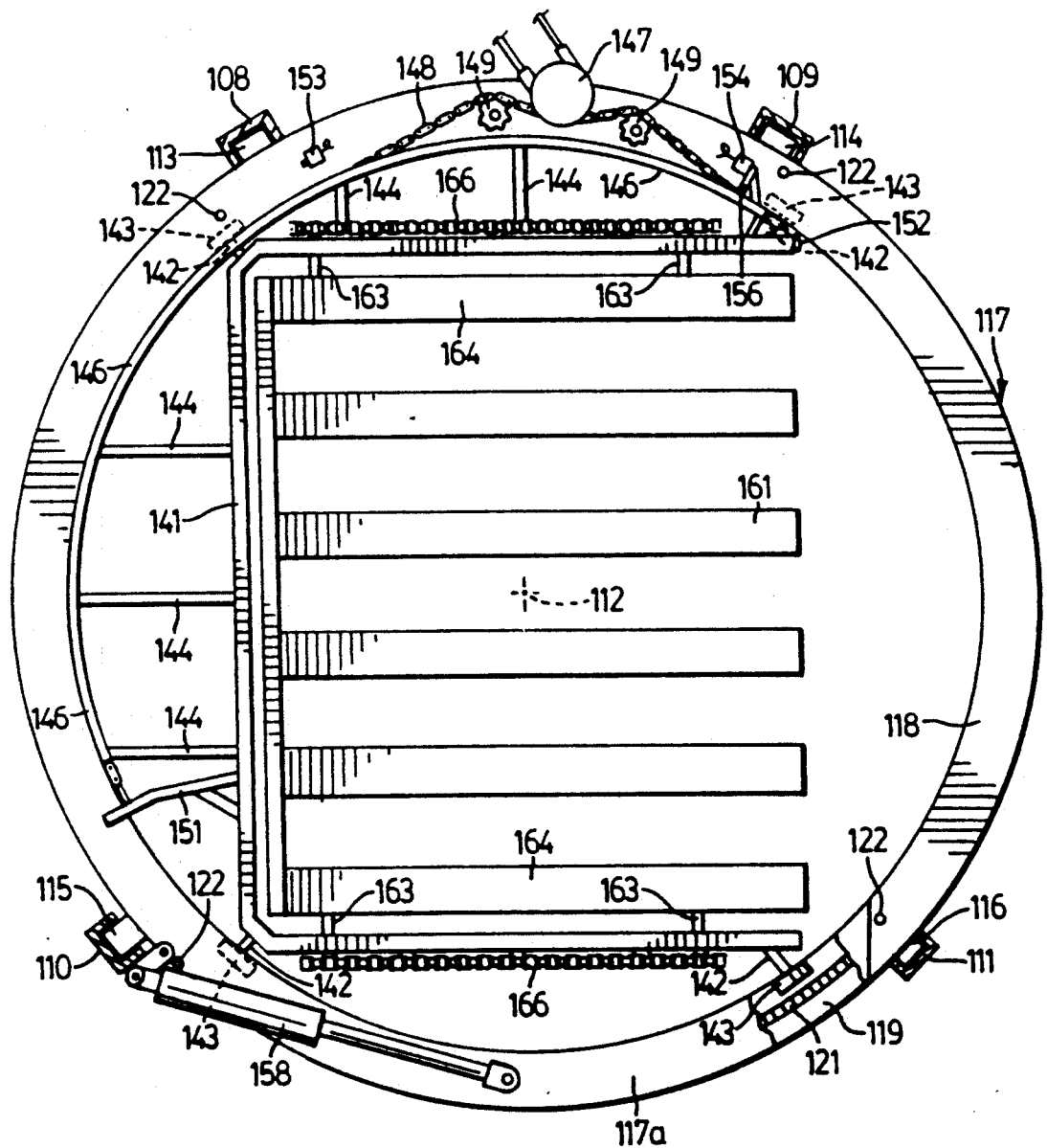
FIG. 9 is a view taken along line 9—9 in FIG. 2 showing the support members, sub-frame and a circular track within which the sub-frame rotates.
Figure 10:
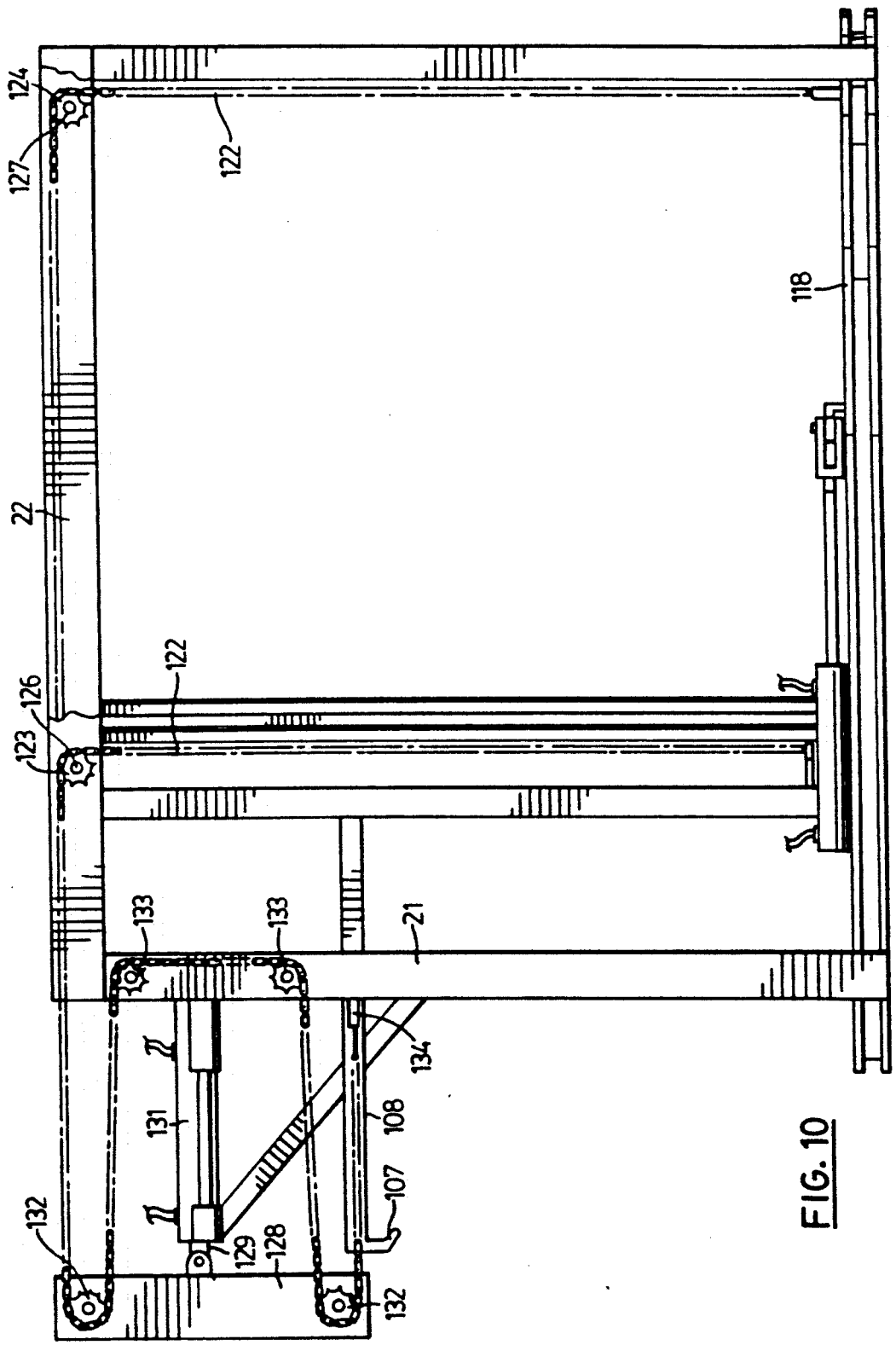
FIG. 10 shows somewhat schematically a side view along the line 10 in FIG. 1 showing a portion of the arrangement for raising and lowering the circular track.
Figure 12:
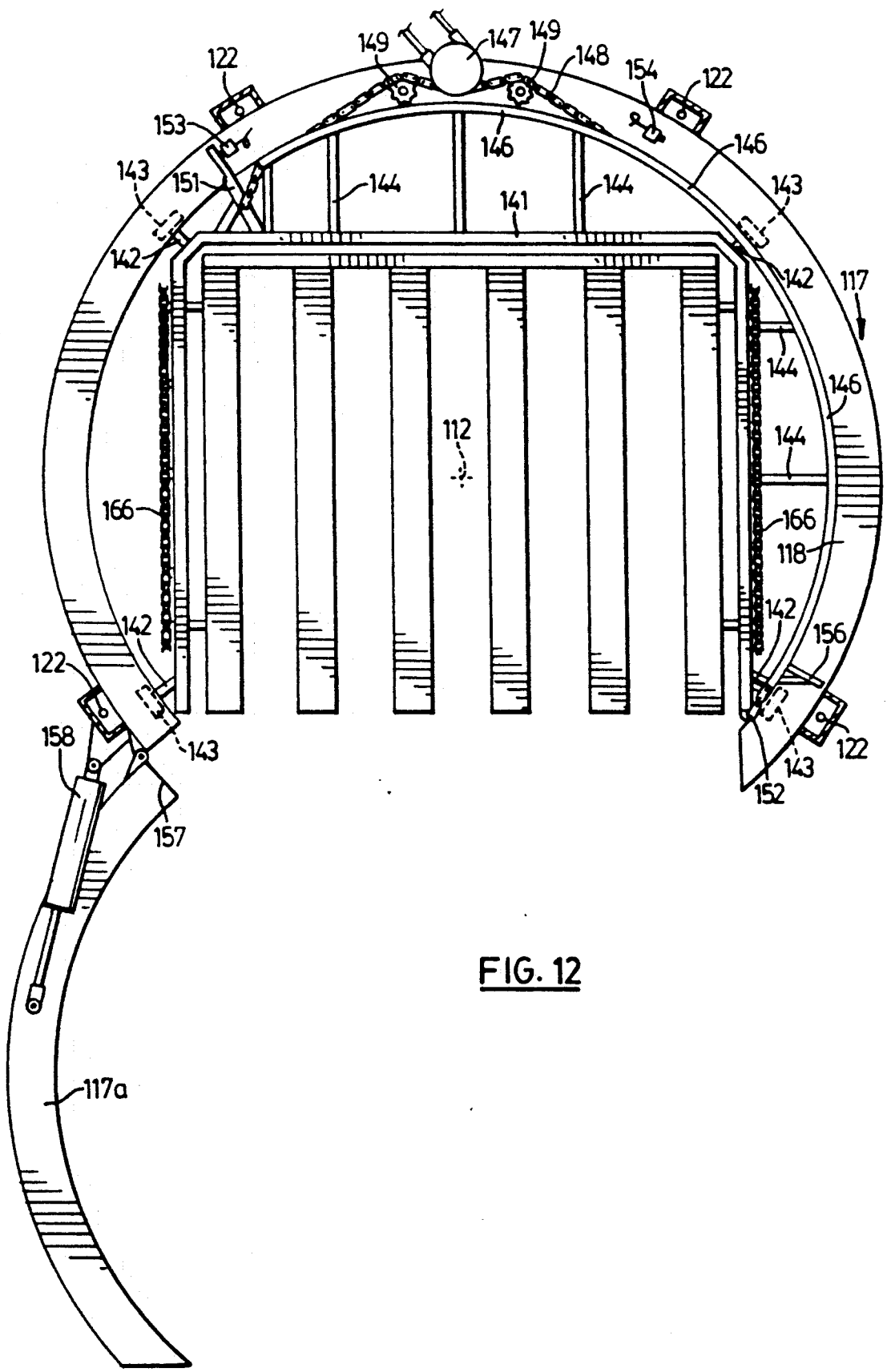
FIG. 12 is a view similar to FIG. 9 showing the support member and sub-frame rotated through 90° and an unloading gate portion of the truck in open position.

A rectangular sub-frame or turntable carriage 141, best seen in FIGS. 9 and 12, having three sides and an open fourth side rotates freely about the vertical axis 112 within the track 117. The carriage 141 has shafts 142 projecting outwardly from its corners and provided with rollers 143 running on the lower inner flange 119 of the track 117. The inner side of the I-section in effect forms a channel in which the rollers 143 run. On two sides, the carriage 141 connects rigidly through cross supports 144 to a raised part circular chain guard 146 which extends above and along the inside of the track 117 on an arc having its centre of curvature coincident with the axis 112 and subtending an angle a little less than 180°.

The turntable carriage 141 together with the chain guard 146 is rotated within the track 117 by a traction motor 147 having a driven sprocket (not seen in the drawings) engaging a chain 148 passing over idler sprockets 149 journalled on the upper side of the track 117. The chain is anchored at one end to a switch actuating lever 151 connected to the carriage 141 and at the opposite end at an anchoring point 152 at a corner of the carriage 141 generally opposite the lever 151.

In the preferred form, the motor 147 is actuated by a pair of manually operated turntable switches, preferably spaced apart so that one switch has to be operated by each hand as a safety measure. The switches may be provided in, for example, an operator's cab, for example in the cab of the sod harvester apparatus. The motor 147 is controlled by limit switches 153 and 154 on the track 117. At the extreme counter-clockwise rotation as seen from above in FIG. 9 an actuator member 156 connected to the chain guard 146 strikes the switch 154. This stops the motor 147 and reverses the power feed (e.g. hydraulic feed) to the motor 147 so that, when the above-mentioned pair of manually-operated switches is next operated, the turntable carriage 141 is rotated clockwise to the position shown in FIG. 12 wherein the lever 151 activates the switch 153, stopping and reversing the motor 147 until the above mentioned pair of manually operated turntable switches are next actuated. The switches 153 and 154 and members 151 and 156 are arranged so that each time the pair of manually operated switches are depressed, the carriage 141 rotates through 90°, each rotation being in an opposite direction to the next.

A minor arc portion or gate portion 117a of the track 117 is formed separately from the major arc portion, as seen in FIGS. 9 and 12. The gate portion 117a is articulated to the main portion at a hinge 157. A hydraulic piston and cylinder arrangement 158 connects between the minor arc and main portions 117 and 117a, allowing the gate portion 117a to be swung between open and closed positions as seen in FIGS. 12 and 9, respectively, under the control of gate control switches (not seen) provided preferably in the operator's cab.

Figure 7:
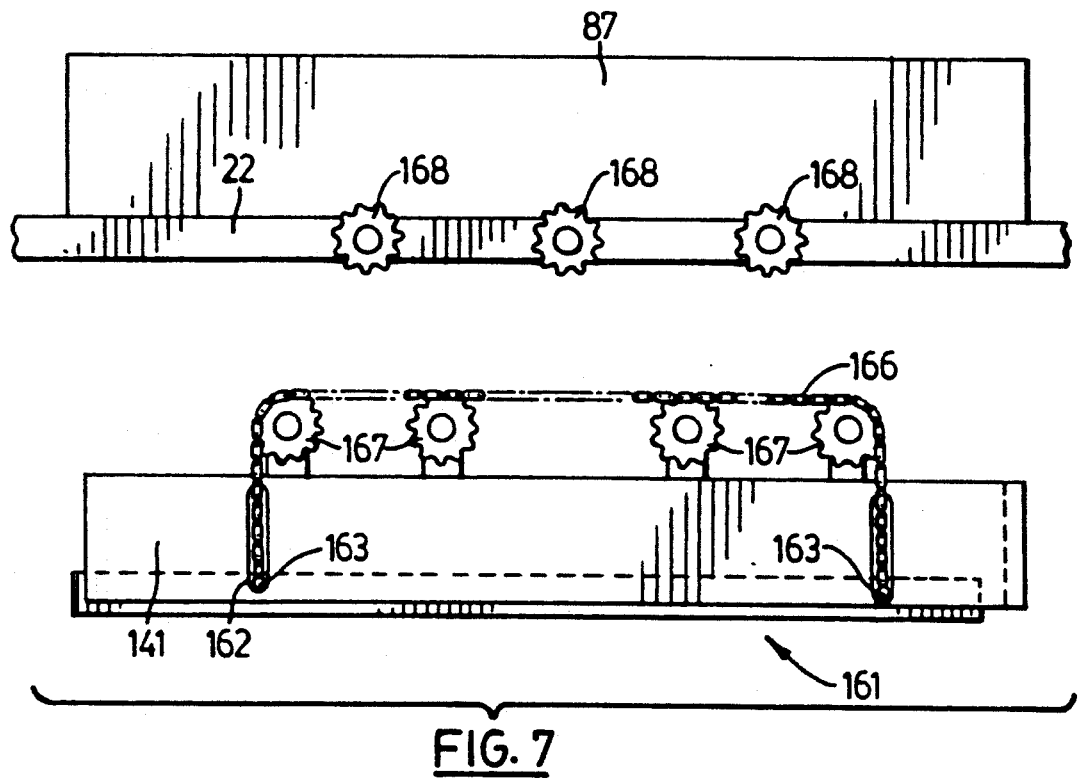
FIGS. 7 and 8 show sub-frame and support members in normal and in upwardly displaced positions, respectively, viewed in the direction of line 7—7 in FIG. 4.
Figure 8:
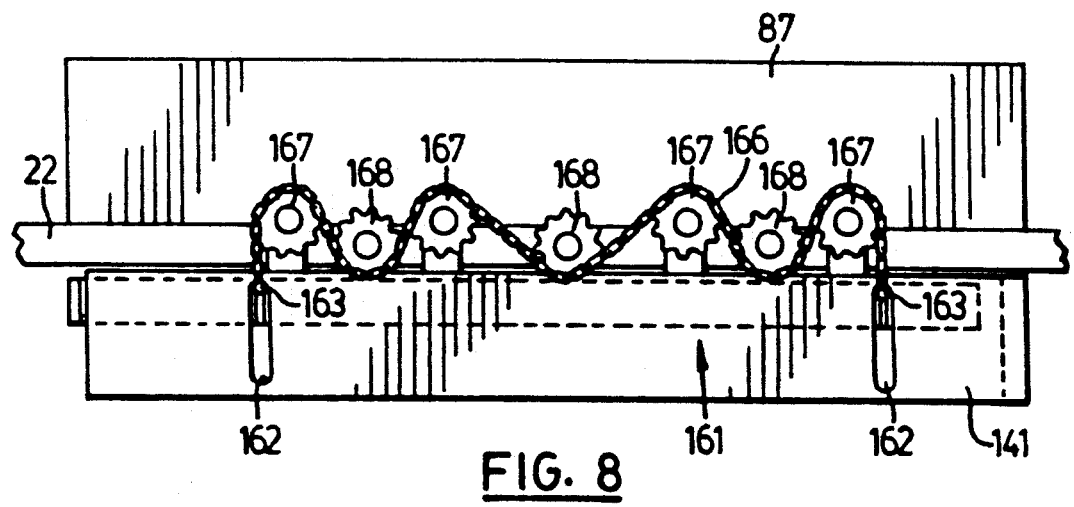

A set of forks 161 is supported in the carriage 141 through a lost motion linkage comprising a pair of laterally spaced vertically extending slots 162, seen best in FIGS. 5 to 8 in each of the two opposing sides of the carriage 141. Through each slot 162 extends a rod 163. The inner end of each rod 163 is connected to a side member 164 of the forks 161. The outer end of each rod 163 extends beyond the adjacent outer side of the carriage 141 and adjacent pairs of the ends of the rods 63 are connected by a length of chain 166 as best seen in FIGS. 7 and 8. The chain 166 runs over a set of spaced sprockets 167 freely rotating on axles which extend laterally outwardly of the sides of the carriage 141. A set of upper freely rotatable tensioning sprockets 168 is provided on the outer side of each lower transverse frame member 22, as seen in FIGS. 1, 7 and 8. With the carriage 141 oriented relative to the track 117 in the position shown in FIGS. 4 and 9, and the track member in the upper position of FIGS. 2, 3 and 11, the sprockets 168 tension the chain 166 downwardly between the sprockets 167 as seen in FIG. 8, drawing the rods 163 and the forks 161 upwardly from a position as seen in FIGS. 1 and 7 in which the lower sides of the forks 161 are slightly below the lower flange 119 of the track 117 to an upwardly displaced position relative to the carriage 141, as seen in FIGS. 5 and 6, so that the forks 161 are closely adjacent the underside of the floor 89. In this position the rolls 34 fall only a small distance onto the forks 161 as the sliding floor 89 is withdrawn as seen in FIG. 5, so that the rolls 34 are not broken or damaged as they fall onto the forks 161.

Figure 13:
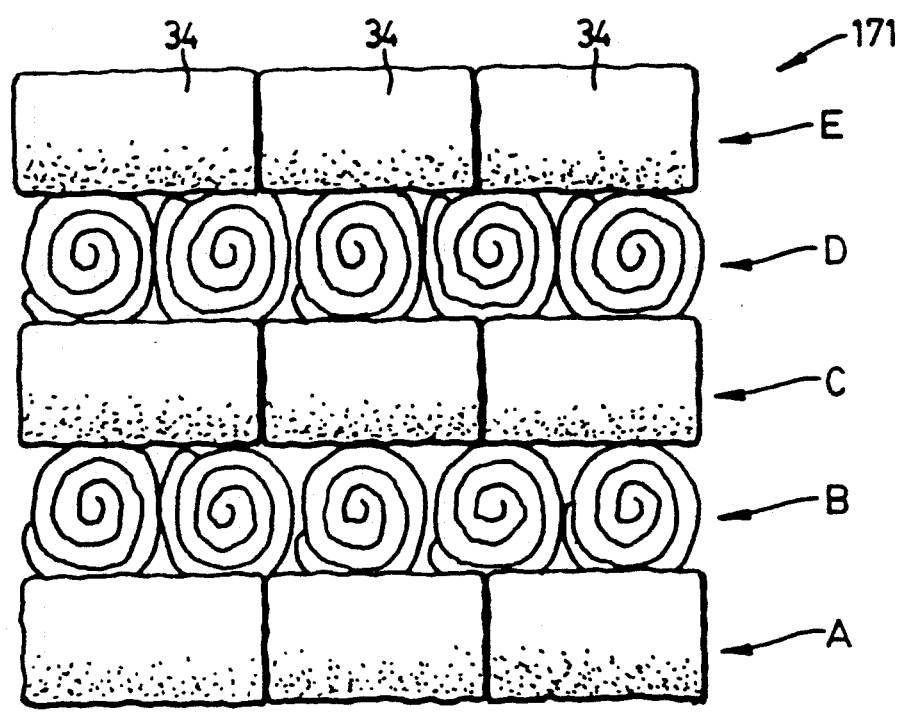
FIG. 13 is a view of a completed stack of sod rolls.

Referring to FIGS. 1, 9 and 12 these show the structure of the forks 161 in more detail. In the preferred form the forks are so-called "palletless forks" which enable a stack of sod rolls to be picked up from or deposited directly on the ground, without the need for a supporting wooden pallet or the like. As seen in FIG. 1, each fork 161 is substantially triangular in section, and the forks 161 are spaced apart so that when the first five by three layer "A" of sod rolls 34 is deposited on the forks 161 with the forks in the position of FIG. 9, as seen in FIG. 5, rolls 34 drop downward so that the centre line or axis of each transverse column of three adjacent rolls 34 is disposed approximately mid-way between a pair of the forks 161, and the lower most point on the circumference of each roll is at or slightly below the lower edge of the forks 161 as seen in FIG. 6. Hence a stack 171 of rolls as seen in FIG. 13 can be deposited direct on the ground by the set of forks 161 in the lowermost position as seen in FIG. 1. Similarly, a stack 171 deposited on the ground can be engaged and picked up off the ground by a set of palletless forks provided on a fork lift truck or the like, similar to the forks 161.

In use, the stacker apparatus is attached to a sod harvester apparatus 29 as seen in FIG. 1. If not already closed, the gate portion 117a of the track 117 is closed by retracting the piston of the arrangement 158, by operating the gate control switches. If necessary, the turntable switches are operated to position the forks 161 in the FIG. 9 position, and the track raise override switch operated to raise the track 117 together with the forks 161 to the position of FIGS. 2, 3, 5, 6, 8 and 11. In this position the forks 161 are displaced upwardly in the turntable carriage 141 as seen in FIGS. 5, 6 and 8.

The harvester 29 together with the stacker apparatus is then moved over the sod field to be harvested, so that rolls 34 of sod are formed and presented successively at the top of the covering 36 as seen in FIG. 2. As each roll 34 falls into the paddle 48, the switch 62 is activated causing the paddle 48 to lift to the position of FIG. 3, inserting and compressing the roll 34 in the tunnel 39. The paddle 48 then drops to the FIG. 2 position ready to receive the next roll 34. If the operator, normally seated in a cab within the harvester 29 adjacent the top of the conveyor 36, sees a defective roll 34, the paddle override switch referred to earlier may be pressed. This raises the paddle 48 to the FIG. 3 position so the defective roll drops downwardly out of the apparatus.

Successive rolls 34 accumulate in the tunnel, each inserted roll 34 pushing the preceding roll 34 rearwardly until a complete row of, in this case, five rolls 34 is built up, as seen in FIG. 2, whereupon the rearmost roll 34 activates switch 83 and the pusher plate 74 pushes the row laterally onto the floor 89. This operation continues until the third row is pushed onto the floor, so that the leading corner of the layer "A" thereby formed actuates switch 102 as seen in FIG. 4. The motors 97 are actuated and the floor 89 commences to retract as seen in FIG. 5. It will be noted that the floor 89 retracts in the same direction as that in which the pusher plate 74 moves so that the tractive effort of the floor 89 assists the action of the pusher plate 74. When the floor 89 is fully open, and the first layer "A" of rolls 34 is loaded on the forks 161 as seen in FIG. 6, the switch 99 is actuated. This stops the motors 97 and opens dumping valves, allowing fluid to be dumped from cylinders 131 and 131a under the pressure exerted by the pistons 129 and 129a until the switch 136 is deactuated as the cam follower 137 falls into the recess between the first two lobes 139. This closes the dumping valves, so that the pistons 129 and 129a are temporarily locked in a partially retracted position relative to the cylinders 131 and 131a. The chains 122 and track 117 have at this point been lowered by a distance determined by the retraction of the pistons 129 and 129a together with the tensioning devices 128 and 128a. As the turntable carriage 141 drops together with the track 117, the tensioning chains 166 disengage the sprockets 168 and the forks drop relative to the turntable carriage 141 to the position seen in FIG. 7. As a result, the upper side of the first layer "A" is lowered to a position approximately that of upper side of the forks 161 in the starting position shown in FIG. 5. Deactuation of the switch 136 also causes the motors 97 to be operated in a sense closing the floor 89 toward the fully inserted position of FIG. 4. When the floor 89 is fully closed, the switch 98 is actuated. This stops the motors 97 and provides a signal to the operator in the operator's cab. For example, it may illuminate a warning light in the operator's cab, indicating that the floor 89 has closed. The operator then operates the manually operated turntable switches so that the turntable carriage 141 is rotated through 90° about the axis 112 to the position shown in FIG. 12. The above cycle of operation then is repeated, commencing with the activation of the switch 102 when the leading corner of the next layer of rolls 34, indicated as layer "B" in FIG. 13 is pushed onto the floor 89. As a result, the layer "B" is deposited on layer "A" with the axes of its rolls at right angles to the rolls of layer A, as seen in FIG. 13. The alternating orientation of successive layers of rolls provides the stack with increased stability.

The above operation is repeated until a stack 171 as shown in FIG. 13 having five layers A through E has been built up on the forks 161. At this point, the turntable 141 and forks 161 have lowered to a point intermediate the lower and upper positions of FIGS. 1 and 2, and the tensioning member 128a and cam 138 have moved inward to a position in which the cam follower 137 is adjacent the inner side of the innermost lobe 138. The forks 161 are in the position shown in FIG. 9. To remove the stack 171 from the stacker apparatus, the operator actuates the manually operated turntable switches to rotate the fork to the FIG. 12 position and operates the track lowering override switch to allow the track 117 to lower fully to the position corresponding to FIGS. 10 and 11. At the same time, the operator actuates the gate control switch to open the gate as seen in FIGS. 1 and 11. With the track 117 fully lowered, the lower side of the forks 161 is at ground level and the lower most portions of the circumference of the rolls 134 of the lower layer "A" engage the ground so that the stack 171 slides rearwardly off the forks 161 to be left deposited on the ground surface as the stacker moves forwardly. The stack 171 may then be picked up by a fork lift or similar vehicle equipped with palletless forks and carried to trucks or like vehicles on which the sod roll stacks are to be conveyed to purchasers thereof.

The above description provides ample information for those skilled in the art to determine the nature, constitution of and operation of the necessary electrical and hydraulic logic circuits for operating the various moving parts of the above apparatus in response to the above-described manually-operated switches and above-described limit switches in the required sequences. Therefore, such logic circuits have not been described in detail above.

The above detailed description with reference to the drawings has described the preferred form of the stacker apparatus, but as will be appreciated by those skilled in the art, numerous modifications may be made to the structure and to the manner of its operation.

For example, for accommodating rolls 34 of different lengths, the apparatus may be equipped with a paddle 48 and a tunnel 39 of increased or decreased widths. For example, the devices may accommodate 24 inch long rolls. In such case each sod roll layer may comprise two rows of 24 inch long rolls, each roll being approximately 9 ½ inches diameter and each row having five rolls so that the dimension of each layer is 48 inches by 47 ½ inches. Other diameters and lengths of rolls may be employed to form preferably substantially square layers comprising a plurality of rows, with each row containing a plurality of rolls 34. The stacker apparatus may be self-propelled and self-powered instead of relying on electrical, hydraulic or other power connections to the conventional sod harvester apparatus.

Other modifications may of course be made as will be appreciated by those skilled in the art without affecting the spirit and scope of the invention as defined in the appended claims.

I claim:

1. A mobile stacker for stacking sod rolls, comprising a frame supported on ground reaction members for movement over the ground and having thereon:

means for assembling successive pluralities of said sod rolls in an elongated row wherein each roll has its axis transversely of the direction of elongation;

a platform member adjacent the assembling means;

means for pushing each said elongated row transversely from said assembling means onto an upper surface of said platform member thereby building up a layer comprising a plurality of said rows disposed laterally adjacent one another on said upper surface;

a support member positioned below the platform member;

means for removing said platform member allowing said layer on said platform member to move downwardly to be supported on said support member;

means for rotating said support member intermittently about a vertical axis through an arc of 90°; and means for lowering and raising the support member whereby a stack of sod rolls comprising a plurality of adjacent layers, of which the rolls in each layer have their axes disposed at right angles to the rolls of adjacent layers, is built up on the support member.

2. A stacker as claimed in claim 1 wherein said means for assembling comprises guide means for guiding successive rolls longitudinally in a direction at right angles to their axis, a stop member at one end of the guide means for limiting motion of the rolls at said one end, and a sod roll propulsion member at an opposite end.

3. A stacker as claimed in claim 2 in combination with means for delivering to said assembling means sod rolls of substantially uniform diameter and wherein said guide means comprise upper and lower members and the spacing between said upper and lower members is less than said diameter and said members compressively deform said sod rolls when they enter said guide means.

4. A stacker as claimed in claim 3 wherein the upper member is supported on means whereby the spacing between the upper and lower members can be adjusted.

5. A stacker as claimed in claim 2 wherein said guide means comprise an upper and a lower flight of rollers.

6. A stacker as claimed in claim 2 wherein said propulsion means comprise a sod roll receiving member pivoting between a lower position wherein a sod roll can be deposited on said receiving member and an upper position wherein said sod roll engages said guide means.

7. A stacker as claimed in claim 6 including a deflector member adjacent said opposite end of said guide means inclining upwardly in the direction of movement of said receiving member from the lower to the upper position.

8. A stacker as claimed in claim 2 wherein said one end of the guide means is provided with actuating means responsive to the pressure of a sod roll at said one end to activate said means for pushing.

9. A stacker as claimed in claim 1 wherein said means for pushing comprises a plate extending along a side of said assembling means remote from the platform member and means for displacing the plate transversely toward the platform member.

10. A stacker as claimed in claim 1 wherein said means for removing said platform member shifts said platform member laterally relative to said frame.

11. A stacker as claimed in claim 10 wherein said removing means shifts said platform member laterally away from said assembling means in the direction of movement of said rows transversely from said assembling means onto said platform members.

12. A stacker as claimed in claim 10 comprising actuating means responsive to movement of said layer onto said platform member to actuate said means for removing.

13. A stacker as claimed in claim 1 wherein said support member comprises a sub-frame movable by said means for lowering and raising between an upper position adjacent said platform member and a lower position adjacent the ground surface, a set of spaced parallel fork tines supported displaceably upwardly in said sub-frame, and means displacing said fork tines upwardly from a normal lower position to an upper position directly underlying said platform member when the sub-frame is raised adjacent said platform member.

14. A structure as claimed in claim 13 wherein said displacing means comprise a flexible line member connected at each end to said forks and passing over spaced tensioning members connected on said sub-frame, and an engager member supported on said frame and engaging said line member when said sub-frame is in its upper position.

15. A stacker as claimed in claim 14 wherein the flexible line member is a chain and the tensioning members are sprockets rotatably mounted on said sub-frame.

16. A stacker as claimed in claim 1 including circular track means having its centre coincident with said vertical axis, bearing members supporting said support member for rotation on said circular track means about said axis, and wherein said means for rotating act to rotate said support member relative to said track means, and said means for raising and lowering act to raise and lower said track means relative to said frame.

17. A stacker as claimed in claim 16 wherein said track means comprise a channel section beam and said bearing members run inside said channel.

18. A stacker as claimed in claim 16 wherein said rotating means comprise a flexible line anchored at its ends at points spaced apart angularly more than 90°, and traction drive means on said track means engaging said line and driving it relative to said track means.

19. A stacker as claimed in claim 18 including a part circular line guard connected on said support member and extending around the inner side of said track means, said line extending on the outer side of said guard.

20. A stacker as claimed in claim 18 wherein said line is a chain and said traction means comprises a driven sprocket.

21. A stacker as claimed in claim 16 wherein a minor arc portion of said track means is pivotally supported on a major arc portion of said track means, said minor arc portion swinging outwardly to enable removal of a stack of sod rolls from said support member.

22. A stacker as claimed in claim 1 wherein said means for raising and lowering the support member comprise a plurality of flexible line members each having one end connected at a respective attachment point to said support member, said attachment points being laterally spaced with respect to the support member, and each having an opposite end connected to the frame, a line tensioning member engaging an intermediate portion of each line, and means for moving each line tensioning members laterally of the frame to tension said lines and raise the support member.

23. A mobile stacker for stacking sod rolls, comprising a frame supported on ground reaction members for movement over the ground and having thereon:

a platform member;

layer forming means adjacent the platform member for forming on an upper surface of the platform member a layer comprising a plurality of elongated rows of sod rolls disposed laterally adjacent one another, with each of said sod rolls having its axis extending in the same direction;

a support member positioned below the platform member;

means for removing said platform member allowing said layer on said platform member to move downwardly to be supported on said support member;

means for rotating said support member intermittently about a vertical axis through an arc of 90°; and means for lowering and raising the support member whereby a stack of sod rolls comprising a plurality of adjacent layers, of which the rolls in each layer have their axes disposed at right angles to the rolls of adjacent layers, is built up on the support member.

* * * * *